United States Patent
Vacca

(10) Patent No.: US 10,507,720 B2
(45) Date of Patent: Dec. 17, 2019

(54) FLAP CONTROL DEVICE FOR MOTOR VEHICLE AND FRAME COMPRISING SUCH A DEVICE

(71) Applicant: Valeo Systemes Thermiques, Le Mesnil Saint-Denis (FR)

(72) Inventor: Frédéric Vacca, Le Mesnil-Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 0 days.

(21) Appl. No.: 15/572,900

(22) PCT Filed: May 12, 2015

(86) PCT No.: PCT/EP2015/060414
§ 371 (c)(1),
(2) Date: Nov. 9, 2017

(87) PCT Pub. No.: WO2016/180475
PCT Pub. Date: Nov. 17, 2016

(65) Prior Publication Data
US 2018/0118017 A1    May 3, 2018

(51) Int. Cl.
*B60R 19/52* (2006.01)
*B60K 11/08* (2006.01)

(52) U.S. Cl.
CPC ......... *B60K 11/085* (2013.01); *B60R 19/52* (2013.01); *B60R 2019/525* (2013.01); *B60Y 2400/404* (2013.01); *B60Y 2410/136* (2013.01)

(58) Field of Classification Search
CPC .  B60R 19/52; B60R 2019/525; B60K 11/085; B60Y 2410/136; B60Y 2306/13
USPC .................................. 74/625; 180/68.1, 68.6
See application file for complete search history.

(56) References Cited

U.S. PATENT DOCUMENTS

| | | | |
|---|---|---|---|
| 2008/0133090 A1 | 6/2008 | Browne et al. | |
| 2012/0019025 A1 | 1/2012 | Evans et al. | |
| 2012/0074729 A1* | 3/2012 | Fenchak | B60K 11/085 296/193.1 |
| 2012/0132474 A1* | 5/2012 | Charnesky | B60K 11/085 180/68.1 |
| 2013/0146375 A1* | 6/2013 | Lee | F01P 7/10 180/68.1 |

FOREIGN PATENT DOCUMENTS

| | | |
|---|---|---|
| DE | 20 2011 000453 U1 | 5/2011 |
| DE | 10 2011 087120 A1 | 5/2013 |
| WO | 2013/012337 A1 | 1/2013 |

OTHER PUBLICATIONS

International Search Report issued in corresponding application No. PCT/EP2015/060414 dated Jan. 21, 2016 (6 pages).

* cited by examiner

*Primary Examiner* — Dennis H Pedder
(74) *Attorney, Agent, or Firm* — Osha Liang LLP

(57) ABSTRACT

A flap control device spring driven toward open position upon actuator failure.

9 Claims, 5 Drawing Sheets

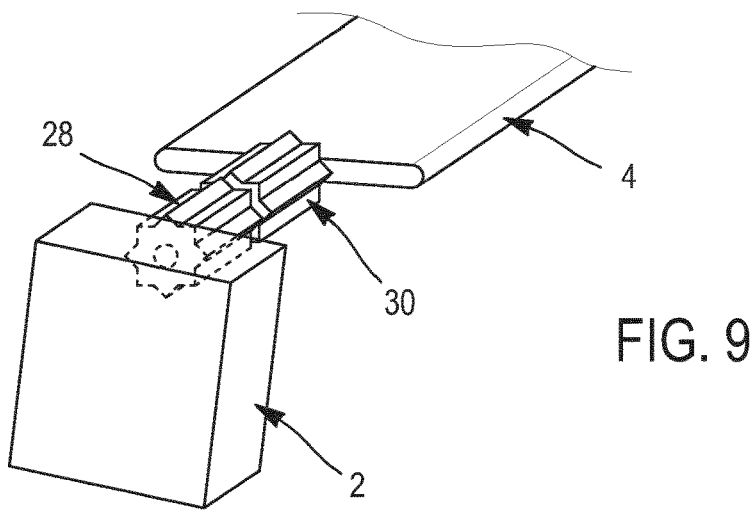
FIG. 9
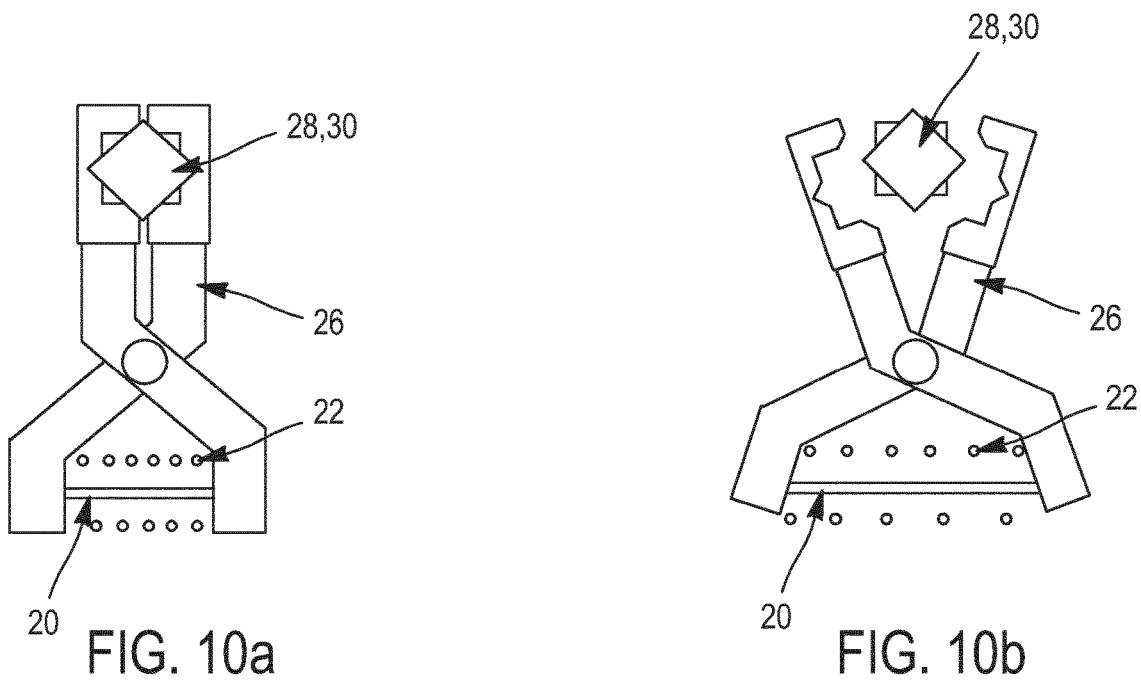
FIG. 10a
FIG. 10b
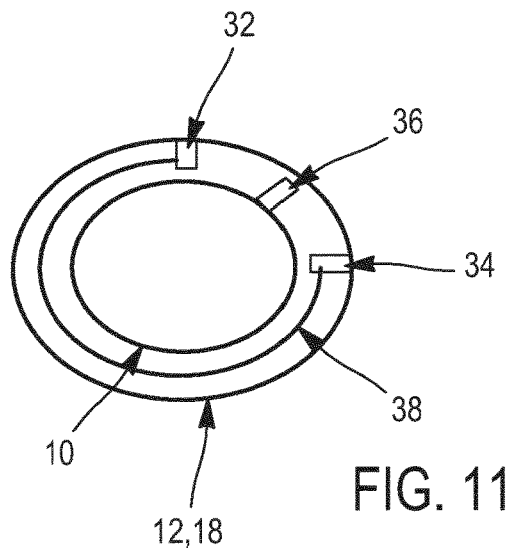
FIG. 11

FLAP CONTROL DEVICE FOR MOTOR VEHICLE AND FRAME COMPRISING SUCH A DEVICE

TECHNICAL FIELD OF THE INVENTION

The invention relates to a flap control device for a motor vehicle comprising at least one flap and an actuator moving said at least one flap between a closed and open position. The invention also relates to a frame comprising such a device.

PRIOR ART

It is known that motor vehicles comprise an air inlet in which heat exchangers are arranged. This air inlet can be obstructed to a greater or lesser extent by flaps which are controlled by an actuator, this occurring as a function of the use conditions of the heat exchangers.

These controlled flaps are used to reduce the coefficient of drag and to improve the cooling and air-conditioning performance. However, in the event of failure of the actuator, the flaps can be blocked in the closed position, which obstructs the passage of air toward the heat exchangers, thus resulting in overheating of the engine.

It is also known to incorporate a return spring secured to the actuator. Thus, in the event of failure of the actuator, for example due to a break in the electrical signals, the return spring returns the flap system into the open position so as to allow the flaps to let air pass through and thus avoid overheating of the engine. However, this system implies that the actuator must permanently overcome the return force of the spring, which has the disadvantage of an oversizing of the reduction gear part and involves higher current consumption. Moreover, if the actuator should suffer a failure of mechanical nature, such as, for example, a breakage of a reduction pinion in its gearing, the possibility of reopening then becomes impossible, which leads inevitably to overheating of the engine and emergency stopping.

SUMMARY OF THE INVENTION

The objective of the present invention is to solve these disadvantages by proposing a flap control device for a motor vehicle comprising at least one flap and an actuator moving said at least one flap between a closed and open position. According to the invention, said flap is able to be detached from said actuator in the event of failure thereof.

Thus, with such a device, the flap is able to adopt an open position unblocking the air inlet. Air can thus exchange with the fluids circulating in the heat exchangers, thus avoiding overheating of the engine and emergency stopping of the vehicle.

The change of position of the flaps can be brought about by various factors, such as, for example, the dynamic pressure of the air or else the aspiration of the motorized fan unit.

Particular embodiments according to the invention propose that:
said flap is able to be detached from said actuator in a reversible manner in the event of failure of said actuator;
the device comprises a detachment means such as a movable core securing said actuator with said at least one flap;
the detachment means comprising a movable core is actuated by a solenoid;
the detachment means comprising a movable core is actuated by a clutch;
the clutch comprises a spring made of shape memory alloy material and a return spring which are able to move the movable core;
the device comprises a connector which connects a set of flaps;
the connector comprised in the device is a movable link rod;
the device comprises a driver which controls the rotation of said at least one flap;
the connector is positioned between the driver and the set of flaps;
the device comprises a return means moving the connector and the set of flaps toward an open position;
the device comprises at least one movable stop blocking the movement of the movable core in order to restrict the rotation of said at least one flap between the two open and closed positions.

The invention also relates to a frame comprising a device as described above.

BRIEF DESCRIPTION OF THE FIGURES

Other features and advantages of the invention will emerge on reading the following description with reference to the appended figures, in which:

FIG. 9 illustrates a partial schematic representation of the device according to one particular embodiment.

FIGS. 10a and 10b are detailed views of a clutch of the device of the invention in two configurations of one and the same embodiment.

FIG. 11 is a sectional view of the securing means of the device according to the invention.

DETAILED DESCRIPTION OF THE EMBODIMENTS

Figure 1:
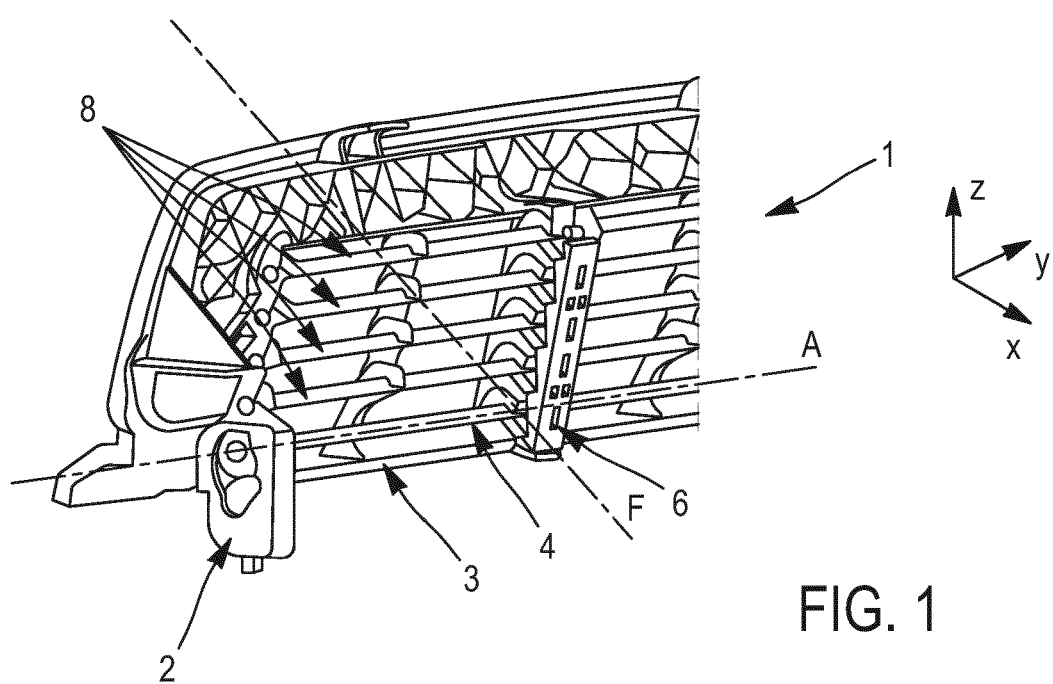
FIG. 1 illustrates a partial perspective view of a frame comprising a device with flaps according to the invention.

FIG. 1 illustrates a frame 3 comprising a flap control device 1 with an actuator 2 which controls a flap 4, termed control flap, between an open end position and a closed end position.

The frame 3 corresponds to a chassis with two longitudinal sides and two lateral sides for a given thickness. The frame 3 has a rectangular shape so that the longitudinal sides are larger than the lateral sides. The flap control device 1 is situated in the interior area of the frame 3 such that all the flaps cover the whole of the interior area of the frame 3. The frame 3 can be made of various rigid materials so as to fix the device 1 in one position; however, certain elements such as the actuator 2 can be attached to the frame without thereby being contained in the interior area of the flap. The frame 3 can adopt other geometric shapes, such as, for example, a square or else a circle, the invention thus not being limited to the shape of the frame 3.

The actuator 2 also controls the rotation of flaps 8, termed secondary flaps. The actuator 2 drives the control 4 and secondary 8 flaps with the same rotary movement defined about an axis of rotation represented by the axis A.

When the control 4 and secondary 8 flaps are in the open position as represented in FIG. 1, namely when they extend in a longitudinal direction (x) and transverse direction (y) with respect to the axes of the vehicle, the air inlet is freed and the outside air flow can pass through the passage of the frame 3 along the arrow F.

When the control 4 and secondary 8 flaps are in the closed position, that is to say when they extend in a transverse direction (y) and vertical direction (z) with respect to the axes of the vehicle, the air inlet is obstructed and air cannot cross the frame 3.

The invention is not limited to the number of flaps present in the device. In fact, it is conceivable to have a system with a single flap covering the whole of the air inlet area.

In the device illustrated in FIG. 1, the control 4 and secondary 8 flaps are connected by a connector 6.

Figure 2:
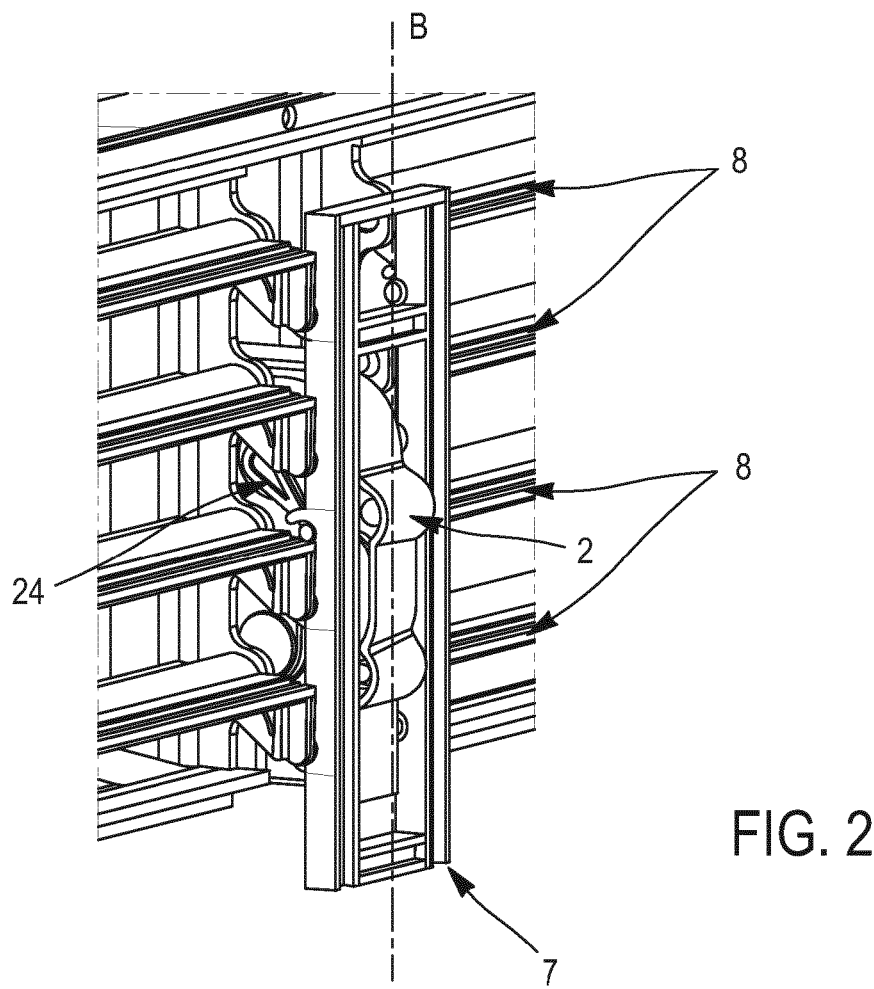
FIG. 2 represents a detail view of a connector connecting the various flaps according to the invention.

FIG. 2 is a more detailed representation of the connector 6. The connector 6 is produced here in the form of a movable link rod 7 which moves with a translational movement represented by the axis B with the device represented here in a configuration where the control 4 and secondary 8 flaps are in an open position.

The actuator 2, under the effect of a control which may be pneumatic, electrical and/or mechanical, actuates the rotation of the control flap 4 about an axis A. The control flap 4 is then driven by pivoting through a defined angle, for example within a range from 0 to 90°. The flap may adopt two end positions, termed open and closed positions.

Either the flap terminates its travel in a position where it extends in a plane defined by the longitudinal (x) and transverse (y) axes, as represented in FIG. 2, this position corresponding to the open position in which air circulates through the frame 3, or the flap finishes its travel in a position where it extends in a plane defined by the transverse (y) and vertical (z) axes, that is to say that the flap terminates its travel perpendicularly to the open position. This position corresponds to the closed position in which the flap obstructs the frame and where air does not circulate through the frame 3. The control flap 4 can terminate its travel in a configuration comprised between these two end positions.

According to another embodiment (not shown), the invention proposes that the flaps extend along any plane defined by the references (x, y, z) and adopts a position comprised between the two end positions, i.e. the open position allowing the passage of air through the frame 3 and the closed position preventing the passage of air through the frame 3. The flaps may change position for example by pivoting, translation or else by sliding.

The flap 4, termed control flap, following its rotation brought about by the actuator 2, causes the connector element 6, in this case the movable link rod 7, to be translated downward or upward along the vertical axis (z) of the vehicle. The movable link rod 7, by moving, causes the simultaneous rotation of each flap 8, termed secondary flap, which adopt the same rotational movement as the flap 4, termed control flap.

It is apparent here that the flap 4, termed control flap, corresponds to any flap situated between the actuator 2 and the connector 6, whereas the flap 8, termed secondary flap, corresponds to any flap situated between the connector 6 and the frame 3.

With such a device, the connector 6 causes the simultaneous opening of the control 4 and secondary 8 flaps of the device, thus making it possible to enlarge the air inlet of the front face of the vehicle and thus promote the exchange between the air and the heat exchangers situated behind the frame 3. More particularly, the movable link rod 7 corresponds to a part allowing the various flaps to be secured in a simple and inexpensive manner using few parts.

The control 4 and secondary 8 flaps can be pivoted in both directions about the axis of rotation A. In the same manner, the movable link rod 7 can be driven in both directions, that is to say in this case upward or downward.

The device represented in FIG. 2 illustrates an actuator 2 secured to the movable link rod 7, thus causing it to be moved translationally without passing via a control flap 4. Here, the actuator 2 controls the rotation of a lever 24 which causes the translation of the movable link rod 7.

Thus, the flap control device for a motor vehicle comprises at least one control 4 or secondary 8 flap and an actuator 2 moving said at least this control 4 or secondary 8 flap between a closed and open position. According to the invention, this control 4 or secondary 8 flap is able to be detached from the actuator 2 in the event of failure of said actuator 2.

Figure 3:
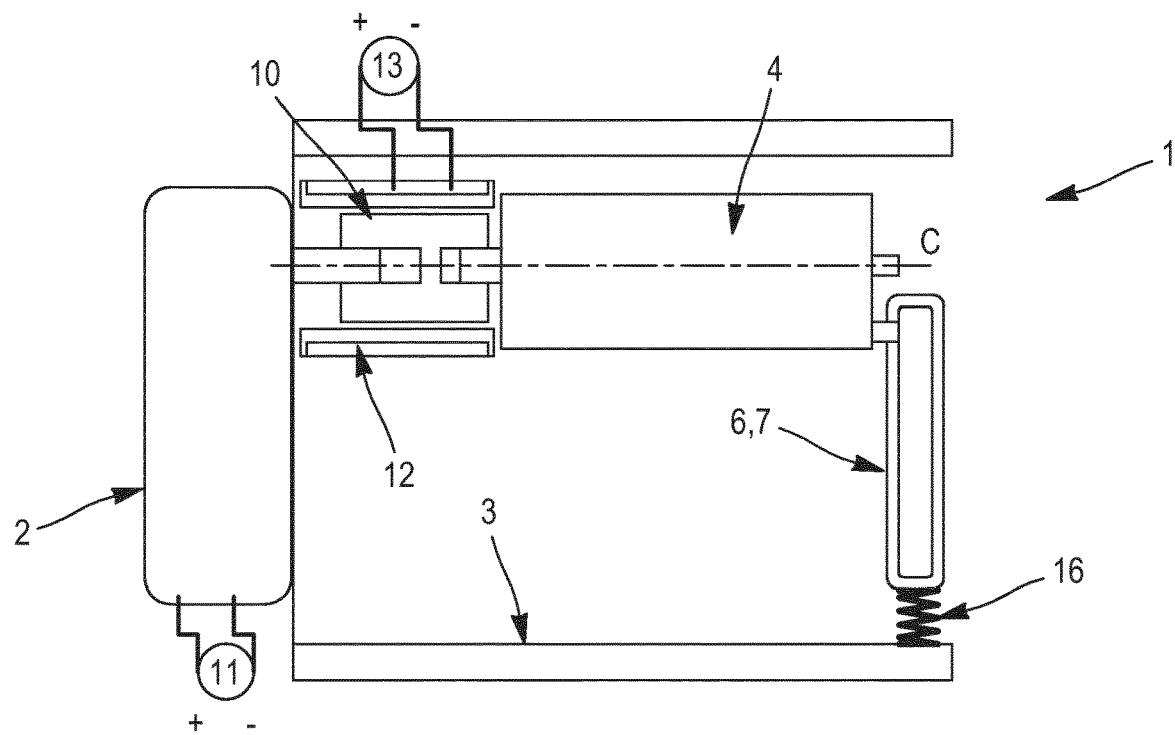
FIG. 3 illustrates a schematic representation of the device according to the invention when the actuator is in an operating state without anomaly according to a first variant embodiment.
Figure 4:
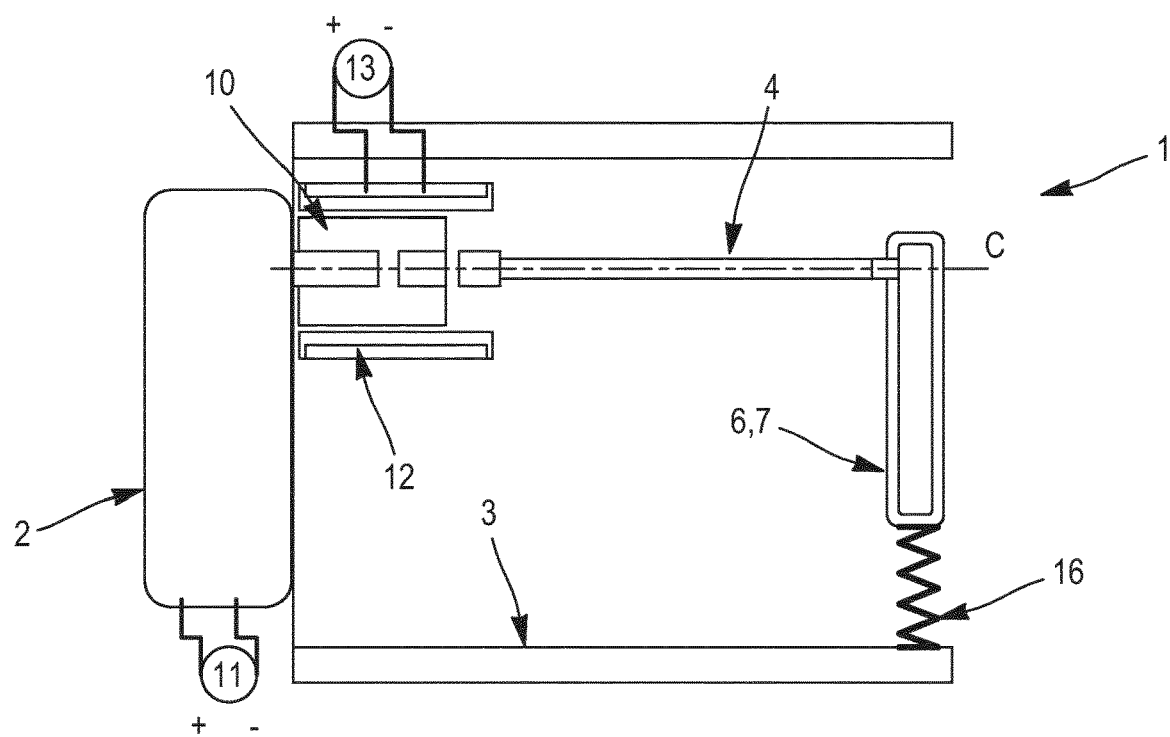
FIG. 4 corresponds to a schematic representation of the device according to the embodiment represented in FIG. 3 following a failure of the actuator.

FIG. 3 illustrates an embodiment of the device where the control flap 4 is in an open position and without failure of the actuator 2, the actuator 2 being secured to the control flap 4. FIG. 4 represents the embodiment illustrated in FIG. 3 following a failure of the actuator 2, where the control flap 4 is detached from the actuator 2.

The device 1 comprises an actuator 2 which serves to rotate the control flap 4. The device 1 also comprises a detachment means produced, here, in the form of a movable core 10 able to move independently of the actuator 2. When the device operates without anomaly, as represented, for example, in FIG. 3, the actuator 2, under the effect of a control, controls the movement, for example by rotation, of the movable core 10 and, with the control flap 4 being secured to the movable core 10, it then adopts the same rotary movement. Here, the rotation of the control flap 4 is not limited and the flap is able to change position under the influence of the actuator 2.

By way of example, the control can be pneumatic, electrical or else mechanical.

The core 10, situated between the actuator 2 and the control flap 4, can move independently of the actuator 2 such that, when the latter is blocked following a failure, the core 10 remains movable and is able to detach the control flap 4 from the actuator 2.

The movable core 10 is, according to the embodiment described by FIGS. 3 and 4, controlled by a solenoid 12 in a direction represented by an axis C. The solenoid 12 can be monostable or bistable.

The solenoid 12 is supplied permanently by a power supply 13, that is to say an electric current accompanied by electrical controls, allowing it to maintain the movable core 10 in connection between the actuator 2 and the control flap 4.

In theory, as illustrated in FIG. 4, where the actuator 2 suffers a failure, such as, for example, when it is no longer supplied following a short-circuit or following a break in the electrical wiring harness or else following a non-functioning of the electrical control of the vehicle preventing it from moving, the solenoid 12 allows the control flap 4 to be detached from the actuator 2. The same is true in the eventuality where an internal breakage, such as a breakage of a reduction pinion, would occur in the gearing of the actuator 2.

Thus, the solenoid 12 will actuate the movable core 10 in such a way that the latter can move independently of the actuator and thus will detach the control flap 4 from the actuator 2.

In the embodiment where the solenoid 12 is monostable, this results in a break in the power supply of the solenoid 13. The latter then becomes magnetically unbalanced and adopts a position, termed release position, while orienting the movable core 10 into an end position along the axis C within the limits of the solenoid 12, as represented in FIG. 4. The control flap 4 is then detached from the actuator 2.

Some embodiments propose combining the power supply 13 of the solenoid with the power supply of the actuator 11, or providing a power supply 13 of the solenoid independent of that of the actuator 2.

In the embodiment where the solenoid 12 is bistable, the power supply 13 of the solenoid determines the positioning of the movable core 10. In such a case, the power supply 13 of the solenoid is independent of that of the actuator 2.

The solenoid 12, according to the device represented in FIG. 4, guides the movable core 10 in such a way that it remains secured to the actuator 2 in the failure-free mode. In the event of failure of the actuator 2, the solenoid 12 will then bring the movable core 10 into a position in which it is not secured to the control flap 4.

It is also possible to conceive of a device (not shown) where the solenoid 12 orients the movable core 10 in such a way that it remains secured to the control flap 4 and that it is detached from the actuator 2 if the latter should suffer a failure.

When the control flap 4 is detached from the actuator 2, it adopts an open position allowing air to pass through the frame 3. The control flap 4 is secured to a connector 6, the latter being attached to a return means, here a return spring 16. According to an embodiment represented in FIG. 3, the return spring 16 is maintained in a compressed position under the action of the frame 3 and of the connector 6, here a movable link rod 7. The latter is itself maintained in such a position by the control flap 4 which itself is maintained in this position under the action of the solenoid 12 and of the actuator 2.

During an operation without anomaly, the solenoid 12 is permanently supplied and maintains the detachment means, here the movable core 10, in connection between the actuator 2 and the control flap 4. The device can thus remain in a configuration where the control flap 4 is in the closed position as represented in FIG. 3 or in any other position defined by the actuator.

Following a failure of the actuator 2, as illustrated in FIG. 4, the movable core 10 is oriented under the action of the solenoid 12 toward a position, termed release position, of the control flap 4, which is then detached from the actuator 2. The return spring 16 is then no longer subjected to mechanical stresses retaining it in a compressed position and adopts a non-compressed configuration. The return spring 16 causes the connector 6, or movable link rod 7, to move, upward here, at the same time causing the control flap 4 to be rotated toward an open position as represented in FIG. 4.

Another embodiment (not shown) proposes that secondary flaps 8, arranged in connection with the connector 6, are also caused, by the movement of the return spring 16 and of the connector 6, to pivot toward an open position in a simultaneous manner with the control flap 4.

Such an embodiment ensures that the flaps will adopt an open position in the event of failure of the actuator 2. Specifically, following the failure of the actuator 2, the control flap 4 is detached from the actuator 2 and the return means 16 returns to its initial position, causing, in its travel, the movement of the connector 6 to which the control 4 and secondary 8 flaps are secured. They will consequently adopt a rotational movement toward the open position without outside intervention. Moreover, as the control flap 4 is detached from the actuator 2, the return force that the spring 16 must overcome is smaller than that of a device or the control 4 and secondary 8 flaps remain secured to the actuator 2. The device according to the invention thus avoids the oversizing of the reduction gear part.

It is also possible to conceive of a device where the return spring 16 causes the movable link rod 7 to move downward or in any other direction allowing the control 4 and secondary 8 flaps to pass from an open to a closed position.

The device, according to the present invention, therefore has the advantage, in a situation where the actuator 2 is faulty, of allowing the return to a configuration where the control 4 and secondary 8 flaps are in the open position without there being a need for outside intervention. This allowing the vehicle engine to be cooled and thus avoids overheating thereof and emergency stopping.

Another advantage of the present invention is that, in the situation where the actuator 2 is back to normal operation, for example following a temporary breakdown, its control electronics allow it to return to a position indexed to that of the movable core 10 and the control flap 4. The movable core 10, under the action of the solenoid 12, then adopts a position where the control flap 4 is secured once more to the actuator 2. The control flap 4 is thus able to be secured to/detached from the actuator 2 in a reversible manner without there being a need for outside intervention by a mechanism which will be explained later.

Figure 5:
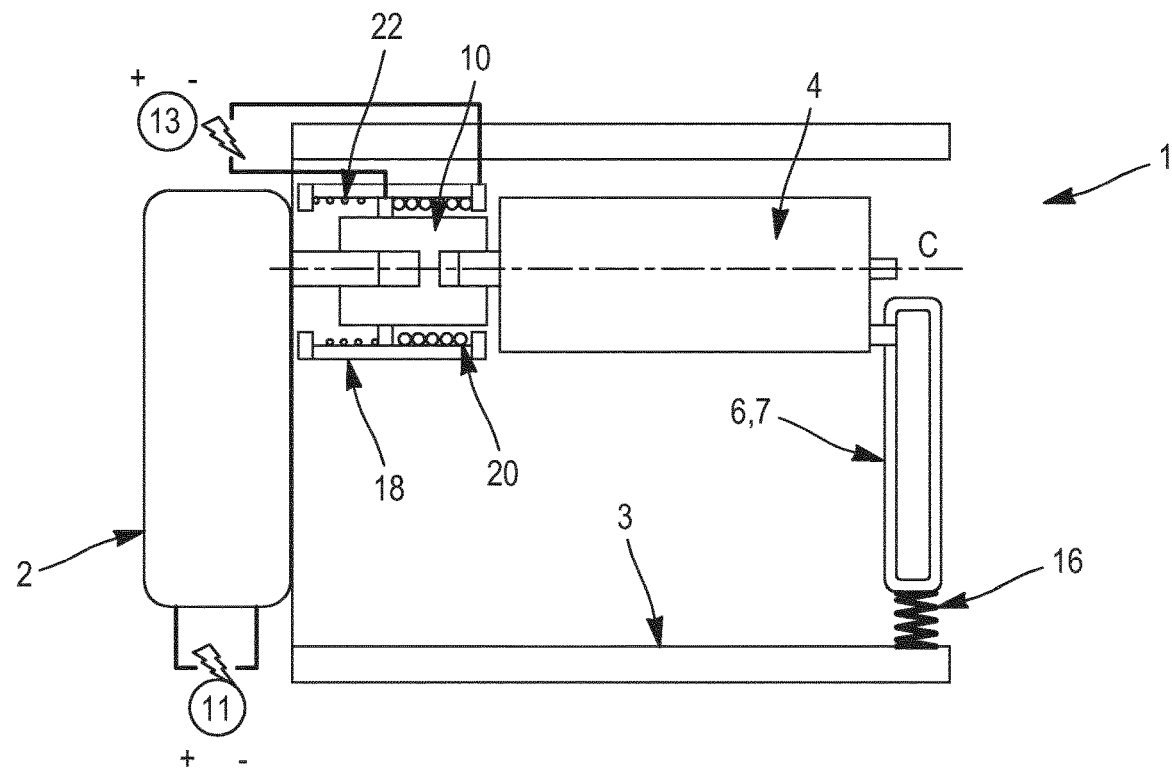
FIG. 5 illustrates a schematic representation of the device according to a second embodiment of the invention when the actuator is in an operating state without anomaly.
Figure 6:
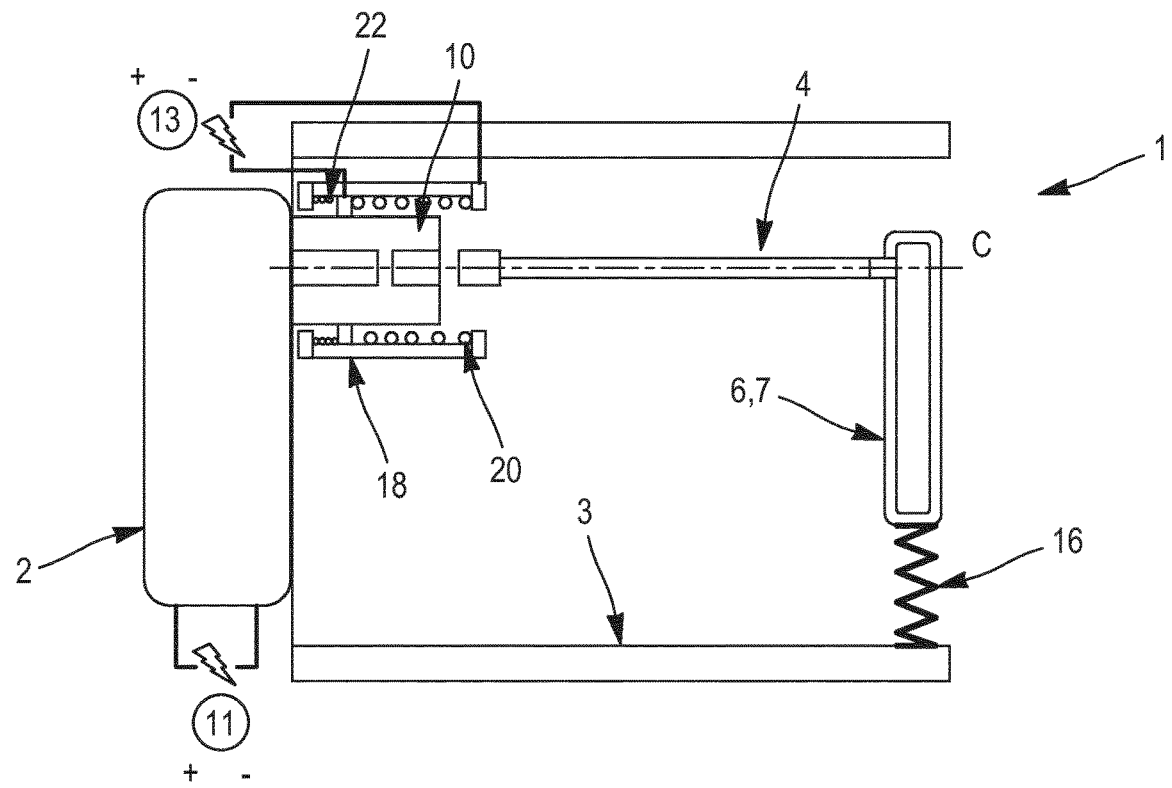
FIG. 6 corresponds to a schematic representation of the device according to the embodiment represented in FIG. 5 following a failure of the actuator.

FIGS. 5 and 6 represent a second embodiment, with FIG. 5 describing an embodiment without anomaly and FIG. 6 representing the embodiment according to FIG. 5 following a failure of the actuator 2.

The detachment means, also produced here in the form of a movable core 10, is, according to the embodiment illustrated in FIGS. 5 and 6, controlled under the action of a clutch 18 in a longitudinal direction represented by an axis C. The clutch 18 comprises a spring 20 made of shape memory alloy material and a return spring 22 which are able to move the movable core 10. The clutch 18 is permanently supplied by a power supply 17.

According to another embodiment, the clutch 18 can also comprise a stretched electrical wire 20 made of shape memory alloy material and a return spring 22 which are able to move the movable core 10, the stretched electrical wire being an equivalent for the spring.

As for the embodiment with the solenoid 12, it is conceivable to combine the power supply 17 of the clutch with that of the actuator 2 or to provide a power supply 17 for the clutch which is independent of that of the actuator 2.

As illustrated in FIG. 5, the clutch 18 comprises a spring 20 made of shape memory alloy material and a return spring 22. Within the context of a configuration with an operation without anomaly, here illustrated with the control flap 4 in the closed position, the return spring 22 is relaxed and the spring 20 made of shape memory alloy material is compressed. The spring 20 made of shape memory alloy material and the actuator 2 are permanently supplied with power. As long as the spring 20 made of shape memory alloy material remains supplied with current, it keeps its compressed shape and maintains the movable core 10 in connection between the actuator 2 and the control flap 4 by virtue of the opposed force exerted by the return spring 22.

In the case where the actuator 2 is no longer supplied, such as, for example, following a short-circuit or following a break in the electrical wiring harness or else following a non-functioning of the electrical control of the vehicle preventing it from moving, the spring 20 made of shape memory alloy material will no longer be supplied with current and, by cooling, the latter will assume its original length, which will cause the control flap 4 to detach from the actuator 2. The same is true in the case where an internal breakage, such as a breakage of a reduction pinion, would occur in the gearing of the actuator 2.

It is also conceivable to propose a device where the spring 20 made of shape memory alloy material orients the movable core 10 in such a way that it remains secured to the control flap 4 and that it is detached from the actuator 2 if the latter should suffer a failure.

Just as for the embodiment described above, the device illustrated in FIG. 5 comprises a return spring 16 in a compressed position under the action of the frame 3 and of the connector 6, here the movable link rod 7.

The clutch 18 is permanently supplied and maintains the movable core 10 in connection between the actuator 2 and the control flap 4 by virtue of the spring 20 made of shape memory alloy material. The device can thus remain in a configuration where the flaps are in the closed position as represented in FIG. 5 or in any other position defined by the actuator.

Following a failure of the actuator 2, the movable core 10 is oriented by the clutch 18 toward a position, termed release position, of the control flap 4 and is detached from the actuator 2. The return spring 16 is no longer subjected to mechanical stresses which retain it in a compressed position. It then returns toward its non-compressed configuration and at the same time causes the control flap 4 to rotate.

According to another embodiment (not shown), the invention proposes secondary flaps 8 connected to the connector 6 which are driven in a simultaneous manner to the control flap 4 toward an open position as represented in FIG. 6.

Another advantage of the present invention is that, in the case where the actuator 2 is back to normal operation, its control electronics allows it to return to a position indexed to that of the movable core 10 and of the control flap 4. The movable core 10 under the action of the clutch 18, once more adopts a position where the control flap 4 is secured to the actuator 2. The control flap 4 is thus able to be secured to/detached from the actuator 2 in a reversible manner.

Figure 7:
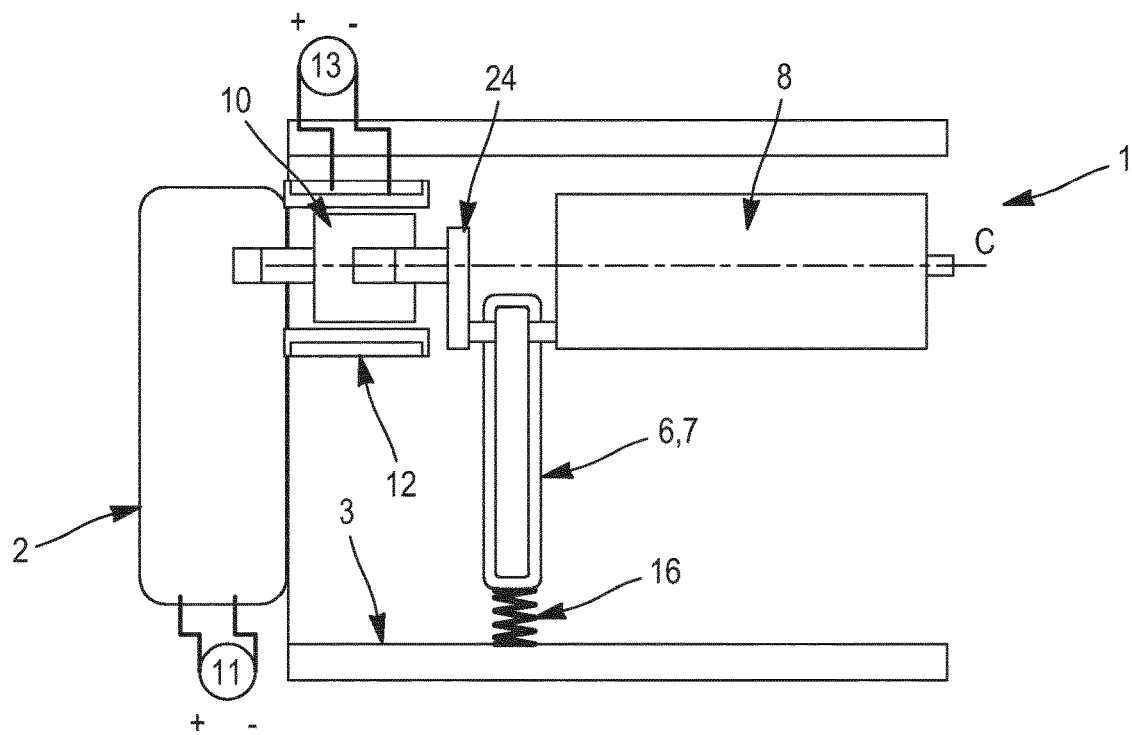
FIG. 7 represents a diagram of a third embodiment according to the invention when the actuator is in an operating state without anomaly.
Figure 8:
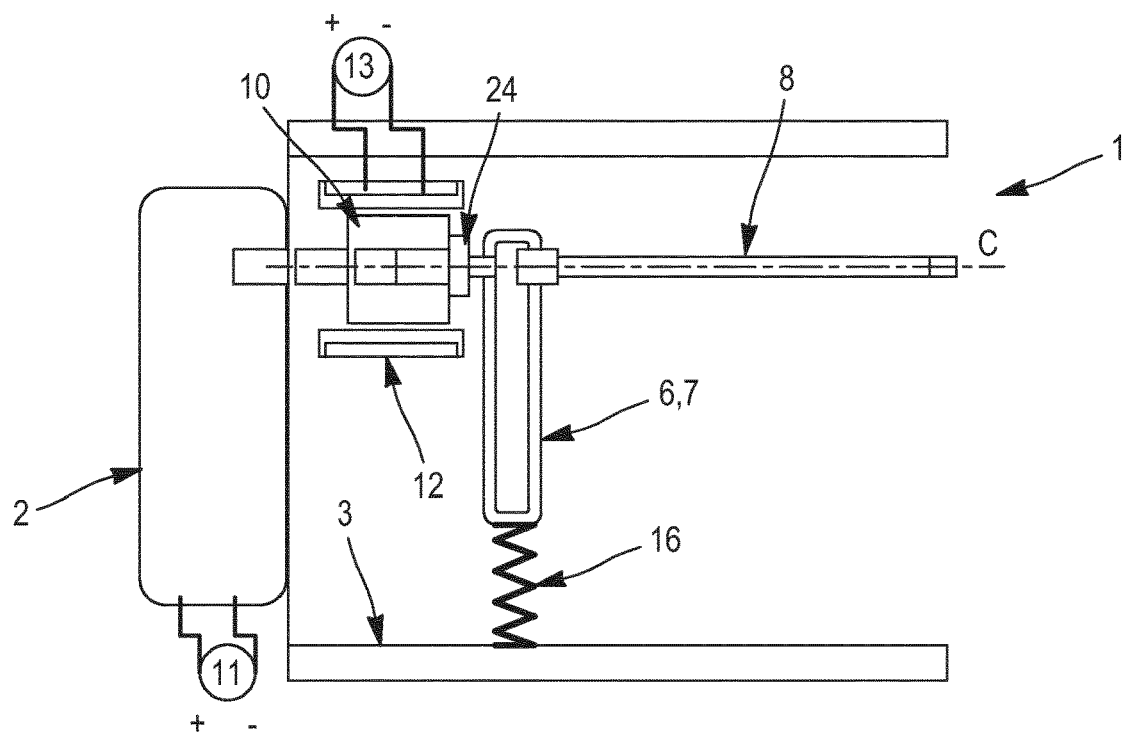
FIG. 8 corresponds to a schematic representation of the device according to the embodiment represented in FIG. 7 following a failure of the actuator.

FIGS. 7 and 8 represent a third embodiment compatible with the two embodiments described above, the embodiment with the solenoid being the only one represented.

FIG. 7 describes an embodiment without anomaly and FIG. 8 represents the embodiment according to FIG. 7 following a failure of the actuator 2.

The device 1 comprises an actuator 2 which controls the rotation of a lever 24. The device 1 also comprises a detachment means here produced in the form of a movable core 10 able to move independently of the actuator 2. The device also comprises a connector 6 which secures the secondary flaps 8 to the lever 24 and a return spring 16 which actuates the connector 6, and indirectly the secondary flaps 8, toward a closed position where air can no longer pass through the passage of the frame 3.

The lever 24 is secured to the actuator 2 and causes the secondary flaps 8 to rotate. It corresponds in this embodiment to the equivalent of the control flap 4. In the closed position represented in FIG. 7, the actuator 2, under the effect of an electronic control, controls the rotation of the movable core 10, the lever 24 being secured to the movable core 10, then adopts the same rotary movement. The lever 24 drives the connector 6, which then adopts a translational movement. The secondary flap 8, being attached to the connector 6, adopts a rotational movement following the movement of the connector 6 so as to pass from the position represented, closed here, to a new position, such as, for example, the open end position or any intermediate position. The rotation of the lever 24 and of the secondary flap 8 is not limited and therefore the secondary flap 8 is able to change position under the influence of the actuator 2.

With such a device, the lever 24, under the action of the actuator 2, adopts a rotational movement and, via the connector 6, simultaneously transmits this pivoting movement to each secondary flap 8.

The lever 24, once detached from the actuator 2, adopts a configuration where the flap is in the open position in which air passes through the frame 3. Specifically, the secondary flap 8 is secured to a connector 6, the latter being attached to a return spring 16. In the closed position and in the embodiment represented in FIG. 7, the return spring 16 is maintained in a compressed position under the action of the frame and of the connector 6, or of the movable link rod 7. The connector 6 is maintained in such a position by the lever 24 which itself is maintained in this position under the action of the solenoid 12.

The solenoid is permanently supplied with power and maintains the movable core 10 in connection between the actuator 2 and the lever 24. The device can thus remain in a configuration where the secondary flaps 8 are in the closed position or in any other position defined by the actuator 2.

Following a failure of the actuator 2 and as illustrated in FIG. 8, the movable core 10 adopts a release position of the lever 24. The lever 24 is then detached from the actuator 2. The return spring 16 then no longer has mechanical stresses retaining it in a compressed position and moves the movable link rod 7 (upward here) and at the same time causes the secondary flaps 8 to be rotated simultaneously toward an open position.

One particular embodiment (not illustrated) proposes that the return spring 16 causes the movable link rod 7 to be moved downward.

The device described above is also compatible with a movable core 10 which is actuated by a clutch as defined above.

FIGS. 9, 10*a* and 10*b* represent a fourth embodiment. The actuator 2 and the control flap 4 have a protuberance 28 and 30 respectively. The two protuberances are fastened, without being connected, by a clamp 26 which is complementary in shape to the two protuberances 28 and 30 and allows the two protuberances 28 and 30 to be secured.

The clamp 26 has a stretched electrical wire 20 made of shape memory alloy material which maintains the clamp 26 in a tightened or engaged configuration as long as the clamp 26 is supplied with electric current. This keeps the two protuberances 28 and 30 secured, as represented in FIG. 10*a*. In such a configuration, the actuator 2, under the action of an electronic control, will cause the protuberance 28 to rotate.

This rotation then causes the clamp 26 to rotate, which simultaneously causes the protuberance 30 to rotate. The control flap 4, being secured to the protuberance 30, will also pivot between an open or closed position.

As long as the electrical wire 20 made of shape memory alloy material remains supplied with current, it retains its compressed shape and maintains the clamp 26 in connection with the protuberances 28 and 30, as represented in FIG. 10a. In the event of malfunction of the actuator 2, the electrical wire 20 made of shape memory alloy material is no longer supplied and cools. It assumes its original length and no longer exerts mechanical stresses on the clamp 26, which then disengages from the protuberances 28 and 30, as represented in FIG. 10b. The return spring 22 thus allows the protuberance 30, and hence the control flap 4, to be detached from the protuberance 28 and from the actuator 2.

The protuberances 28 and 30 are represented in FIG. 9 as stars. However, it is possible to envision protuberances having other geometrical shapes, such as squares, triangles, circles with stops or any other geometrical polygon.

Whatever the embodiment used, the device 1 comprises three stops 32, 34 and 36 blocking the movement of the movable core 10 in order to restrict the rotation of the driver, that is to say the control flap 4 or the lever 24, between the two open and closed end positions. The movable core 10 has a movable stop 36 on its outer surface. Depending on the degree of inclination of the driver, the movable core 10 pivots under the action of the actuator 2, thus causing the movable stop 36 to rotate and the driver, which is secured to the movable core 10, to rotate. The solenoid 12 or the clutch 18 has two fixed stops 32 and 34.

The movable stop 36 present on the movable core 10 pivots between two end positions. When the movable stop 36 comes into contact with the fixed stop 34, the latter maintains the movable stop 36, and hence the movable core 10 and the driver, that is to say the control flap 4 or the lever 24, in a fixed position. The same principle applies when the movable stop 36 bears against the fixed stop 32. When the stop 36 is in contact with the fixed stop 34, the control 4 or secondary 8 flaps are in an open position. When the movable stop 36 is in contact with the fixed stop 32, the control 4 and secondary 8 flaps are in a closed position.

This has the advantage of limiting the rotational movement of the movable core 10 and hence of indirectly limiting the pivoting of the control 4 and secondary 8 flaps. The movable stop 36 is defined so as to limit the movement of the control 4 and secondary 8 flaps between an open position, where the control 4 and secondary 8 flaps will ensure the maximum air passage through the frame 3, and a closed position, where the control 4 and secondary 8 flaps will completely obstruct the entry of air into the frame 3, thus ensuring airtightness of the device. Such a limit can, for example, be defined by a rotation of the movable core within a range from 0 to 90°. This has the advantage of preventing the flaps from going beyond their two end positions.

According to one embodiment, the solenoid 12 or the clutch 18 also comprises a spiral spring 38 which makes it possible to return the movable core 10 to a reference state and more particularly to return the stop 36 into contact with the stop 34. The driver, being detached from the movable core 10, adopt an open position through the force exerted by the return spring 16. If the actuator 2 suffers a failure at the time when the control flap 4 is in the closed position, with the movable core 10 remaining secured to the actuator 2, the movable stop 36 remains in contact with the stop 32. The driver adopts, for its part, an open position, that is to say a position where the movable stop 36 is in contact with the stop 34. The spiral spring 38 is able to return the movable core 10 into a position where the stop 36 comes into contact with the stop 34. Such an embodiment makes it possible for the device 1 to be repositioned in its initial configuration without outside intervention, the control electronics of the actuator 2 making it possible to return to an angular position indexed to that of the control flap 4.

Such an embodiment makes it possible for the device to be repositioned in an initial configuration and to return to an operating mode without anomaly without outside intervention.

This is particularly advantageous in situations where the failure of the actuator 2 is due to a temporary breakdown. In this hypothetical situation, the driver can continue to drive by virtue of the control flap 4 being detached from the actuator 2. If the actuator 2 starts the function again, the control flap 4 is able to be secured again to the actuator 2 without the user needing to intervene.

According to another embodiment (not illustrated), the invention proposes a configuration where the spiral spring 38 is arranged on the actuator 2, in particular for embodiments of the invention where the movable core 10 remains secured to the control flap 4 and is detached from the actuator 2 following a failure of the actuator 2. The spiral spring 38 allows the actuator 2 to return to an angular position indexed to that of the movable core 10 during the resumption of operation of the actuator 2.

The device is then able to be repositioned in an initial configuration without outside intervention by virtue of the stops 32, 34, 36 and the spiral spring 38.

It is also possible to apply the system of stops and spiral spring to the embodiment with the clamp 26. By placing fixed stops on the frame 3, it is possible to limit the rotational movement of the clamp 26 and hence to indirectly limit the pivoting of the control 4 and secondary 8 flaps.

The invention also relates to a frame 3 comprising a device as described above.

It must be clearly appreciated, however, that these exemplary embodiments have been given by way of illustration of the subject matter of the invention. The invention is not limited to these embodiments described above and supplied solely by way of example. It encompasses various modifications, alternative forms and other variants that a person skilled in the art may be able to conceive of within the scope of the present invention, and in particular any combination of the various embodiments described above.

The invention claimed is:

1. A flap control device for a motor vehicle comprising:
   at least one flap;
   an actuator moving said at least one flap between a closed and open position,
   wherein said at least one flap is able to be detached from said actuator, in a reversible manner, in the event of failure of said actuator;
   a connector which connects a set of flaps including the at least one flap;
   a connecting rod operably connected to the at least one flap; and
   a spring longitudinally aligned with the connecting rod and configured to bias the connector and the set of flaps toward the open position.

2. The device as claimed in claim 1, further comprising a detachment means comprising a movable core securing said actuator with said at least one flap.

3. The device as claimed in claim 2, wherein the detachment means comprising a movable core is actuated by a solenoid.

4. The device as claimed in claim 2, wherein the detachment means comprising a movable core is actuated by a clutch.

5. The device as claimed in claim 4, wherein the clutch comprises a spring made of shape memory alloy material and a return spring which are able to move the movable core.

6. The device as claimed in claim 1, wherein said connector is a movable link rod.

7. The device as claimed in claim 1, further comprising a driver which controls the rotation of said at least one flap.

8. The device as claimed in claim 7, wherein said connector is positioned between the driver and the set of flaps.

9. A frame having a device as claimed in claim 1.

* * * * *